United States Patent
Kuroda

(10) Patent No.: US 7,038,815 B2
(45) Date of Patent: May 2, 2006

(54) IMAGE PROCESSING APPARATUS AND ITS METHOD, AND IMAGE PROCESSING SYSTEM AND ITS CONTROL METHOD

(75) Inventor: Yuji Kuroda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 38 days.

(21) Appl. No.: 10/924,893

(22) Filed: Aug. 25, 2004

(65) Prior Publication Data

US 2005/0219568 A1 Oct. 6, 2005

Related U.S. Application Data

(63) Continuation of application No. PCT/JP03/03530, filed on Mar. 24, 2003.

(30) Foreign Application Priority Data

Mar. 29, 2002 (JP) ............................ 2002-096172

(51) Int. Cl.
*H04N 1/60* (2006.01)

(52) U.S. Cl. .................. 358/1.9; 358/2.1; 358/518

(58) Field of Classification Search ................ 358/1.9, 358/2.1, 518, 523; 382/167
See application file for complete search history.

(56) References Cited

U.S. PATENT DOCUMENTS 5,552,904 A * 9/1996 Ryoo et al. ................. 358/518
5,847,850 A * 12/1998 Kadowaki .................... 358/523

FOREIGN PATENT DOCUMENTS

JP 11-355588 12/1999
JP 2001-71602 3/2001

* cited by examiner

*Primary Examiner*—Scott A. Rogers
(74) *Attorney, Agent, or Firm*—Fitzpatrick, Cella, Harper & Scinto

(57) ABSTRACT

In a case where an image region to be processing in RGB color space and an image region to be processed in YMCK color space are mixed, if objects converted from RGB representation to YMCK representation are re-converted to RGB representation and RGB rendering is performed, the load on the system is increased, and the throughput of a printing apparatus is degraded. Accordingly, bands to be processed in the RGB color space are separated from print information inputted from a host computer, and pre-rendering is performed on the separated bands. Thereafter, bands to be processed in the YMCK color space are rendered by a rendering processing execution unit. The output order of the data of the respective bands pre-rendered in the RGB color space and that of the other bands are adjusted, and the data are sent to a printer engine.

10 Claims, 6 Drawing Sheets

IMAGE PROCESSING APPARATUS AND ITS METHOD, AND IMAGE PROCESSING SYSTEM AND ITS CONTROL METHOD

This is a continuation of PCT/JP03/03530, filed Mar. 24, 2003.

TECHNICAL FIELD

The present invention relates an image processing apparatus and its method and an image processing system and its control method, and more particularly, to image processing for performing rendering processing based on print information in accordance with a print request.

BACKGROUND ART

In a host computer, an application program such as a word processor or a spreadsheet operates on a basic software program such as Windows (trademark of Microsoft Corporation). In a case where printing is performed by using a printing apparatus, such application program calls a function of graphic subsystem among subsystems provided by the basic software program.

For example, the graphic subsystem, which is called a "GDI" (Graphic Device Interface) in the Windows system, handles processing on image information for display and/or a printer. To absorb the difference in functions and characteristics of the respective devices such as the display and the printer, the GDI dynamically links up with a module called a device driver, to perform output processing to the respective devices.

In a module for the printer, called a printer driver, is provided with a group of functions called a "DDI" (Device Driver Interface), to be pre-installed in the device driver in correspondence with the capability, functions and the like of the printer. The DDI function group is arbitrarily called from the GDI by converting an API (Application Programming Interface) call by the application program into data for the device driver. In this manner, a print request from the application program is sequentially processed by the GDI via the printer driver.

When such application of the host computer outputs an image to the printing apparatus, the image is outputted from the printer driver in RGB representation for representing colors by using additive primary colors red (R), green (G) and blue (B), or YMCK representation for representing colors by using yellow (Y), magenta (M), cyan (C) and black (K) in image formation based on the subtractive processing principle.

FIG. 1 is a schematic view for briefly explaining the processing in the case of RGB representation in the host computer.

In FIG. 1, a rectangular object D1 is filled with a red grid pattern, an elliptic object D2 is filled with yellow, a rectangular object D3 is filled with a green hatching pattern, and a circular object D4, filled with a blue tile pattern. When these 4 objects are processed, the printer driver generally performs processing on the objects D1, D2, D3 and D4, in the order of delivery from the system. At this time, ROP (Raster OPeration) characteristic of the GDI of the Windows system exists as rendering information of the objects delivered from the system.

The ROP, which is rendering processing to perform logical operation between images, is used for designation of logical rendering of object, and is provided as ROP2, ROP3 and ROP4 in correspondence with the number of the objects. The ROP designates the shape of a object, a filling pattern, and a logical operation determined mutually with respect to a destination of rendering.

The rendering of the objects D1 to D3 must be sequentially performed since in some cases, a destination as a result of immediately previous rendering is referred to in accordance with designation by the ROP. That is, unless the status of the destination as a result of rendering of the objects D1 to D3 is obtained, a proper result cannot be obtained from rendering of the object D4 based on the ROP.

Generally, these rendering processings are premised on monochrome image or processing in RGB color space.

The printing apparatus such as a printer, which inputs data from the host computer and performs printing, performs image processing in YMCK color space. For this purpose, as shown in FIG. 2, when data in mixed RGB representation and YMCK representation is inputted from the host computer, the printing apparatus converts the input RGB representation data and ROP code on the premise of RGB representation into YMCK representation data, and generates a bit image by a YMCK renderer (rendering generation device).

In a case where RGB representation data is inputted into the printing apparatus and converted to YMCK representation data, the color reproducibility of the object D4 which is not overlapped with the other objects, as shown in FIG. 1, can be approximately maintained by the performance of PDL (Page Description Language) However, regarding the objects D1 to D3 where regions S1 and S2 overlap with each other (in the case of duplication or transparency), in some cases, the validity of the image cannot be maintained even though the printing apparatus processes the above-described ROP code. This problem frequently occurs as the number of duplication is large.

Accordingly, upon rendering of object converted from RGB representation to YMCK representation, the image generating device in the printing apparatus re-converts an object having a duplication region to RGB representation again, then performs RGB rendering, then compresses the bit image and holds it, and transmits the data to a printer engine at necessary printing timing. This processing increases the load on the system and degrades the throughput of the printing apparatus.

DISCLOSURE OF THE INVENTION

The present invention has been made to solve the above-described problems individually or at once, and has its object to perform rendering processing on print information having mixed first image region to be processed in particular color space and second image region not to be necessarily processed in particular color space, while maintaining image validity and reproducibility and preventing degradation of throughput.

To attain the foregoing object, the present invention provides as a preferred embodiment, an image processing apparatus for forming an image based on data inputted from an external apparatus, comprising: a separator, arranged to separate a first image region to be processed in particular color space and a second image region not to be processed in particular color space, from print information accompanying a print request issued from the external apparatus; and a rendering section, arranged to perform respectively different rendering processing on print information in the separated first and second image regions.

Further, the present invention provides an image processing system having a data processing apparatus and an image processing apparatus, wherein the data processing apparatus comprising: a detector, arranged to detect a first image region to be processed in particular color space and a second image region not to be processed in particular color space, from print information; and a notifying section, arranged to notify the detected image regions to the image processing apparatus, and wherein the image processing apparatus comprising: a separator, arranged to separate print information in the first and second image regions, based on notification by the notifying section; and a rendering section, arranged to perform respectively different rendering processing on the print information in the separated first and second image regions.

Other features and advantages of the present invention will be apparent from the following description taken in conjunction with the accompanying renderings, in which like reference characters designate the same name or similar parts throughout the figures thereof.

BRIEF DESCRIPTION OF THE RENDERINGS

The accompanying renderings, which are incorporated in and constitute a part of the specification, illustrate embodiments of the invention and, together with the description, serve to explain the principles of the invention.

BEST MODE FOR CARRYING OUT THE INVENTION

First, a color laser-beam printer as a printing apparatus to which the present invention is applicable will be described. Note that any apparatus may be employed as a printer to which the present invention is applicable as long as it is an image forming apparatus which scans a light beam thereby forms an image, such as a copier or a facsimile apparatus. Further, the printer is not limited to a color laser-beam printer but may be a monochrome laser-beam printer and further may be other types of printers such as an ink-jet printer and a thermal printer.

[Printing Apparatus]

Figure 3:
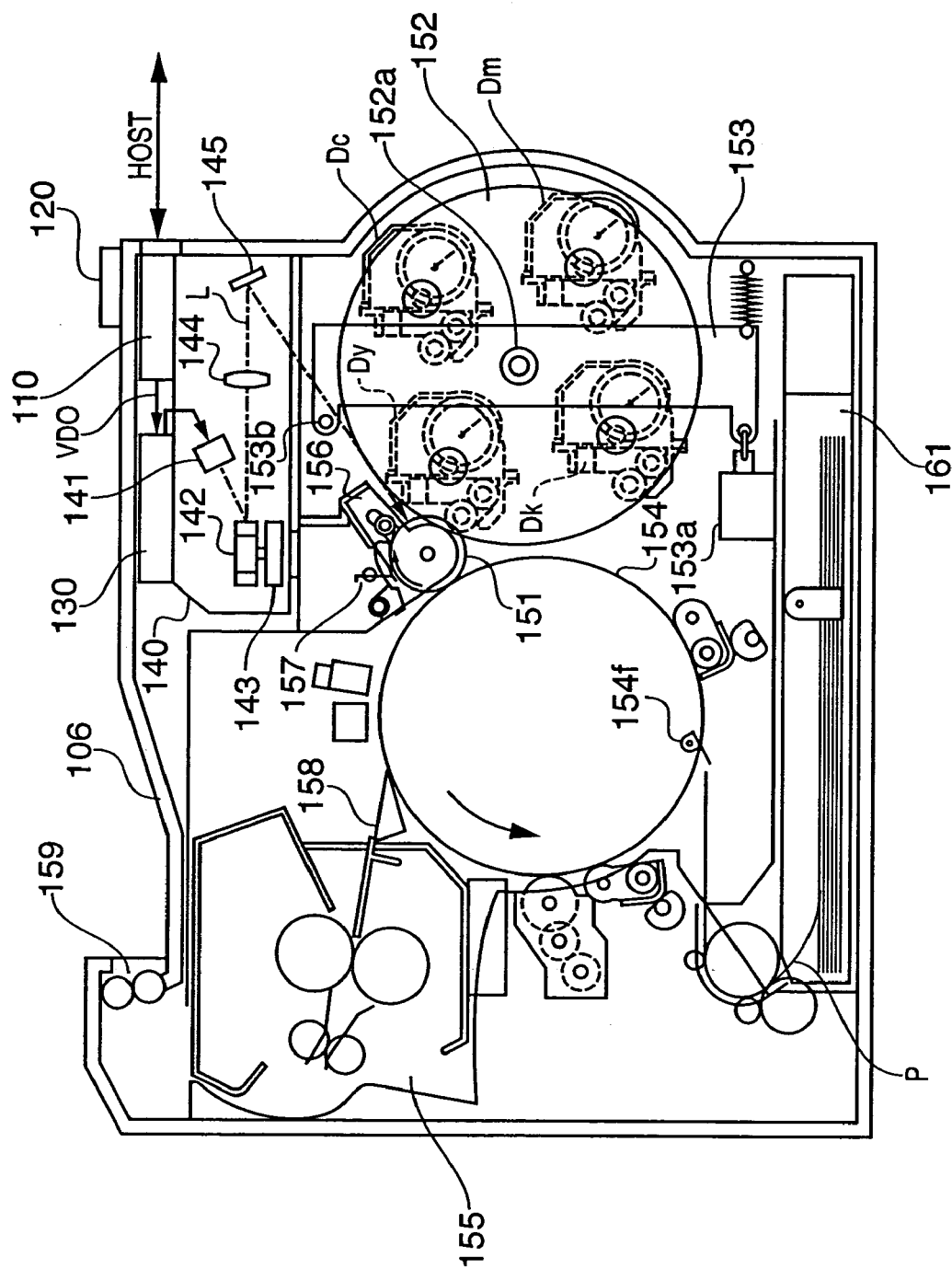
FIG. 3 is a cross-sectional view showing an example of structure of a color laser-beam printer.

FIG. 3 is a cross-sectional view showing an example of structure of a color laser-beam printer (hereinbelow simply referred to as a "color printer").

Figure 1:
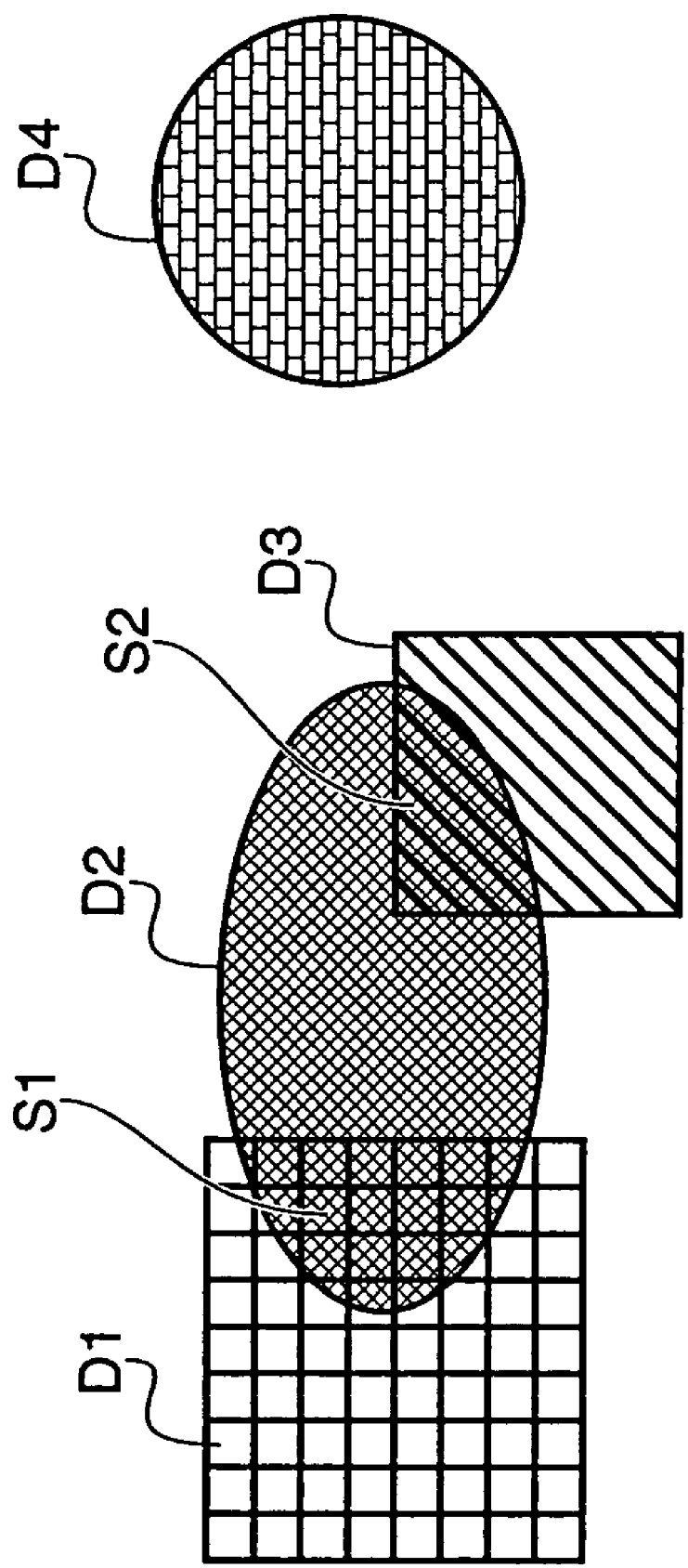
FIG. 1 is a schematic view for briefly explaining the processing in the case of RGB representation in the host computer.
Figure 2:
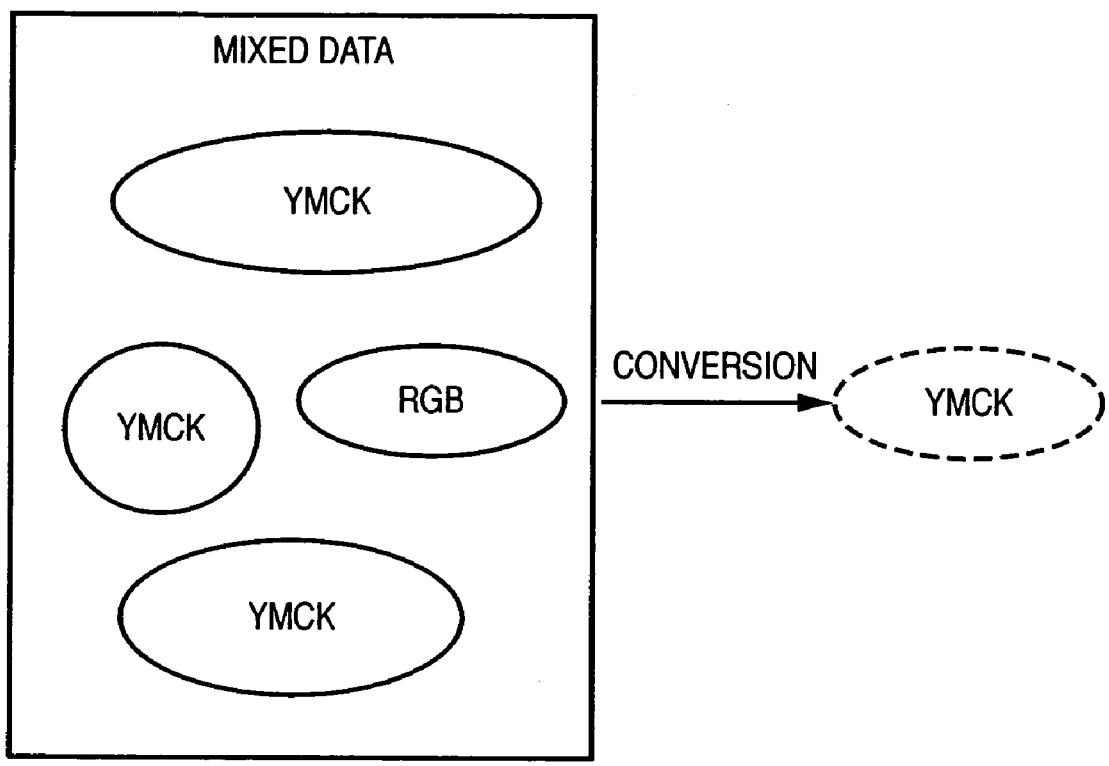
FIG. 2 is an explanatory view showing data in RGB representation and YMCK representation.

The color printer shown in FIG. 1 having a resolution of 600 dpi prints a color image on a print sheet based on data representing color components respectively with 8 bits. The color printer inputs print information including print data (character code, image data and the like) and control code supplied from a host computer or the like externally connected thereto and store the input data, generates a corresponding character pattern or image in accordance with the stored data, and forms a color image on the print sheet as a recording medium.

A controller 110 interprets the print information supplied from the host computer, generates a print image and controls the color printer main body. An operation panel 120, connected to the controller 110, has a switch for inputting a user's instruction, a display device for notifying the user of the status of the apparatus or its operation. Note that the operation panel 120 is provided as a part of exterior of the color printer.

The print image generated by the controller 110 is outputted as a video signal VDO to an output controller 130. The output controller 130 outputs a control signal to an optical unit 140 and various drive system mechanisms based on status information of respective elements of the color printer inputted from various sensors (not shown), thus controls a print operation as the color printer.

The print information image-mapped by the controller 110 is converted into the video signal VDO and sent to a laser driver in the output controller 130. The laser driver drives a semiconductor laser device 141 in correspondence with the video signal VDO. The semiconductor laser device 141 outputs laser light L on/off controlled in correspondence with the video signal VDO. The laser light L is swayed leftward and rightward directions by a polygon mirror 142 high-speed rotated by a scanner motor 143, to scan on an electrostatic drum 151 via an f-θ lens 144 and a reflection mirror 145.

Prior to scanning by the laser light L, an outer peripheral surface of the electrostatic drum 151 is approximately uniformly charged to a predetermined polarity and potential by a charger 156. Accordingly, an electrostatic latent image is formed on the electrostatic drum 151 by the scanning of the laser light L.

Respective color developers each having a rotation shaft on both ends are held by a developer selection mechanism 152 rotatably about the shaft. In this structure, constant positions of the respective color developer can be maintained even though the developer selection mechanism 152 rotates about a rotation shaft 152a for selection of developer. When a selected developer has been moved to a developing position, a selection mechanism holding frame 153 is pulled by a solenoid 153a toward the electrostatic drum 151 at a supporting point 153 as a center, then the developer selection mechanism 152 moves integrally with the developer toward the electrostatic drum 151, and developing processing is performed.

On the other hand, a print sheet P supplied from a paper feed cassette 161 is supplied to a transfer drum 154 at predetermined timing, and a front end of the print sheet P is held by a gripper 154f. Further, to transfer a toner image on the electrostatic drum 151 onto the print sheet P, a transfer bias voltage having an opposite polarity to that of the toner (e.g., plus polarity) is applied to the transfer drum 154, and the print sheet P is electrostatically adsorbed to an outer peripheral surface of the transfer drum 154.

The latent image formed on the electrostatic drum 151 by the optical unit 140 is first developed by a magenta (M) developer Dm. An M toner image generated by the developing is transferred onto the print sheet P held on the outer periphery of the transfer drum 154. Next, an electrostatic latent image corresponding to cyan (C) is formed, and developed by a cyan (C) developer Dc. A generated C toner image is overlay-transferred on the M toner image on the print sheet P. Hereinbelow, similarly, toner images are sequentially formed and overlay-transferred on the print sheet P regarding yellow (Y) and black (K) colors. Note that when the toner image transfer has been completed, remaining toner is removed by a cleaner 157 from the electrostatic drum 151 in preparation for next latent image formation and developing.

In this manner, the 4 color toner images are overlaid on the print sheet P. Note that prior to the toner image transfer, a transfer bias voltage higher than a previous time is applied to the transfer drum 154. When the 4 color toner image have been overlaid on the print sheet P, a separation claw 158 approaches the transfer drum 154, then an end of the separation claw 158 comes into contact with the surface of the transfer drum 154, and the print sheet P is separated from the transfer drum 154. The separated print sheet P is conveyed to a fixing unit 155, then toner images are fixed to the print sheet, and the print sheet is discharged by a paper discharge roller 159 to a paper discharge tray 160.

The color printer of the present embodiment forms an image in 600 dpi resolution through the above image formation process.

[Controller]

Figure 4:
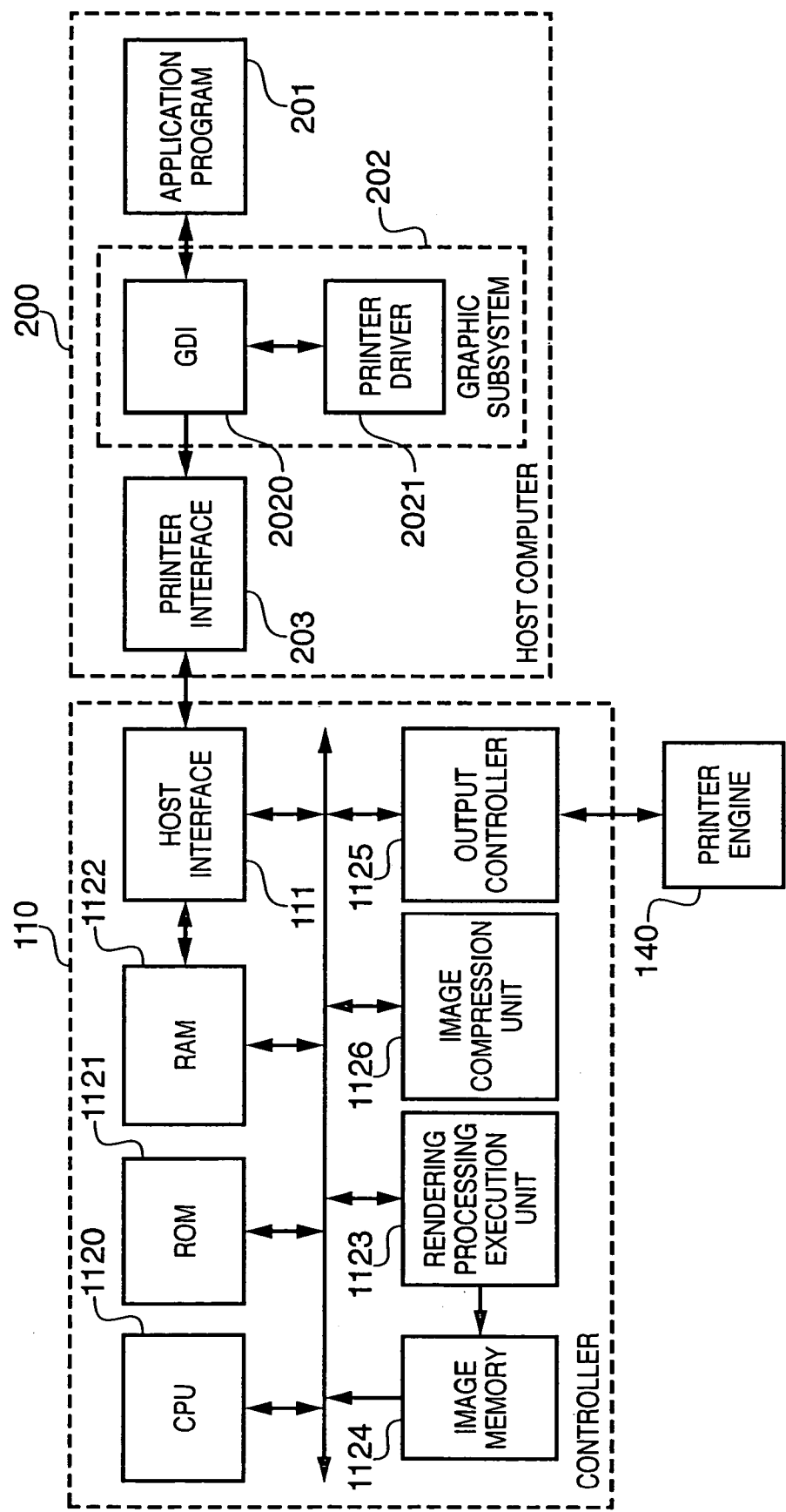
FIG. 4 is a block diagram showing an example of constructions of controller and host computer.

FIG. 4 is a block diagram showing an example of construction of the controller 110 and the host computer 200. The controller 110 as an image processing apparatus in the present embodiment is generally called a PDL controller or the like.

A CPU 1120 controls the controller 110 in a centralized manner. A ROM 1121 is a memory which holds a program executed by the CPU 1120, and the like. A RAM 1122 is a work area for the CPU 1120 and temporarily holds objects necessary for rendering and received data.

A rendering processing execution unit 1123 reads objects from the RAM 1122, develops an image, and stores the developed image into an image memory 1124.

An image compression unit 1126 compresses an image stored in the RAM 1123 or the like, and stores the compressed image into the RAM 1122 or the like, in accordance with the control of the CPU 1120.

An output controller 1125 reads the developed image stored in the image memory 1124 or decompresses the image compressed by the image compression unit 1126 and stored in the RAM 1122 or the like, convert the data into a video signal, and transfers the signal to the printer engine 140.

Further, the host interface 111 controls data transfer with the host computer 200.

Print data of predetermined format, received from the host computer 200 via the host interface 111, is temporarily stored in the RAM 1122, then read and processed by the CPU 201 in accordance with necessity. The CPU 201 executes the control program based on a PDL (Page Description Language) command system and a print job control language, converts the print data into object(s) based on the result of interpretation of the print data regarding printing of character and symbol, and rendering of figure and image, and stores the object into the RAM 1122. Then, when all the data necessary for rendering have been stored into the RAM 1122, the CPU instructs the rendering processing execution unit 1123 to perform rendering processing.

The rendering processing execution unit 1123 is a YMCK renderer which sequentially maps objects of characters and images in the image memory 1124. It is necessary for a page printer such as a color laser-beam printer to transmit data, YMCK plane-sequentially, in page units. However, in the present embodiment, to reduce the capacity of the image memory 1124, so-called banding processing is performed under the control of the CPU 1120.

The banding processing is dividing the print content of each of YMCK planes (1 page) into plural bands thereby using the image memory 1124 having a capacity smaller than that for 1 page. In synchronization with the processing speed of the printer engine 140, a band image is mapped in the image memory 1124. For example, the image memory 1124 is allocated to 2 bands for holding bitmap data in band units. An operation of generating bitmap data in one band memory, and an operation of outputting already-completed 1-band bitmap data from the other band memory, are alternately repeated. That is, when bitmap data is generated in one band memory, already-completed bitmap data is outputted from the other band memory.

By repeating the above processing, continuous bitmap data can be outputted. However, if a predicted period of band rendering is longer than a band printing period, the CPU 1120 determines that it is impossible to perform the banding processing to print 1 band while rendering the next band. In such case, the CPU perform processing for proper printing, by converting the rendering resolution of print data to a lower resolution then performing rendering for whole plane (1 page) and transferring the bitmap data to the printer engine 140, otherwise, previously rendering only the band where the band rendering period is longer than the band printing period, then compressing and holding the data by the image compression unit 1126(pre-rendering). Upon printing, the compressed image data, held in the image compression unit 1126, is transferred to the printer engine 140 by the output controller 1125.

[Host Computer]

The host computer 200 outputs print information comprising print data, control code and the like to the controller 110. The host computer 200 operates based on a basic software program (OS) such as Windows.

Regarding the software program operating on the host computer 200, only functional parts related to the present embodiment, briefly classified as functions operating on the OS, are an application program 201, a graphic subsystem 202, a printer interface 203 as an interface between the host computer and the controller 110.

The application program 201 is application software such as a word processor or a spreadsheet which operates on the OS. The graphic subsystem 202 has a GDI 2020 as a part of the functions of the OS and a printer driver 2021 as a device driver dynamically linked from the GDI. These names and functional frames may somewhat differ with OS, however, such difference in the names and frames is not a big problem in the present embodiment as long as software modules realize the respective functions. Note that generally, in the host computer 200 performs the respective functional modules by the OS with the hardware such as CPU, ROM, RAM, hard disk drive (HDD) and various input/output control units (I/O), and application programs and subsystem processes operate as functional modules under the control of the OS.

[Image Processing]

Figure 5:
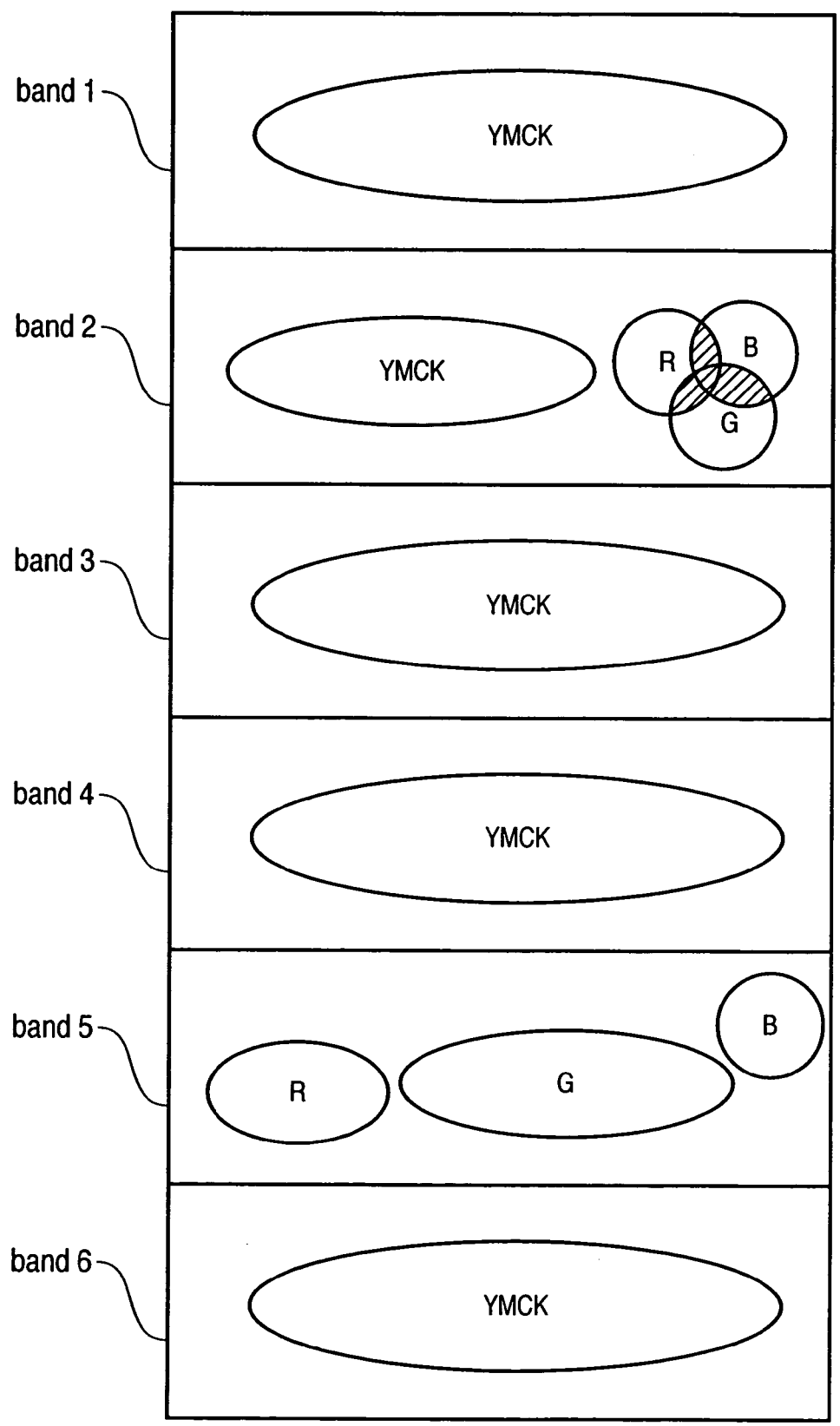
FIG. 5 is a schematic view showing print data for 1 page divided into bands by the host computer.
Figure 6:
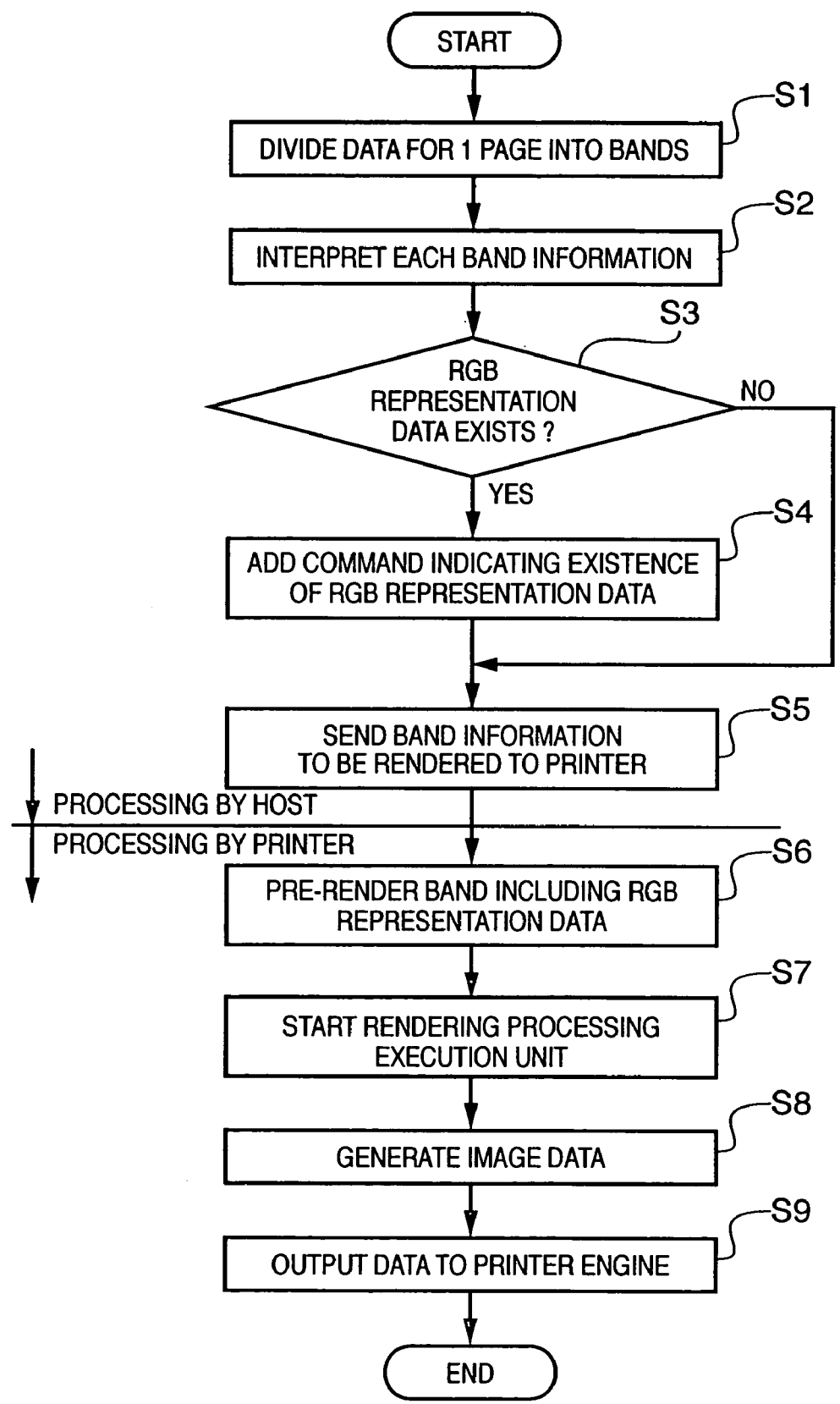
FIG. 6 is a flowchart showing the flow of processing of an embodiment of the present invention.

FIG. 5 is a schematic view showing print data for 1 page divided 200 into bands by the host computer 200. FIG. 6 is a flowchart showing the flow of processing of an embodiment of the present invention.

When a print request to the printing apparatus is generated by the application program 201 of the host computer 200, the GDI 2020 in the graphic subsystem 202 sequentially processes objects via the printer driver 2021, as described above. Then the GDI 2020 sets the outside shape, color information or the like of the objects in accordance with the DDI in the printer driver 2021, and delivers information designating a band memory for rendering and print data indicating a rendering position and the like to the printer interface 203.

That is, the GDI 2020 performs band dividing as shown in FIG. 5 (S1), interprets the information of each band (S2) and determines whether or not RGB representation data exists in any band (S3). For example, in FIG. 5, the print data for 1 page is divided into 6 bands, and RGB representation data exists in bands 2 and 5. As RGB representation data exists, the GDI 2020 adds a command indicating the existence of RGB representation data to output information of the band (S4). In this manner, all the band information discriminating the bands including the RGB representation data from bands including only YMCK representation data is sent to the host interface 111 of the controller 110 via the printer interface 203 (S5).

The controller 110 receives the rendering band information, and separates the bands including the RGB representation data from the other bands. Then regarding the bands including the RGB representation data, the CPU 201 generates objects of the RGB representation data and stores the objects into the RAM 1122. The CPU 201 performs rendering processing on the bands including the RGB representation data without conversion (in RGB color space), then compresses the rendered image data by the image compression unit 1126 and stores the data into the RAM 1122 (S6). The rendering (pre-rendering) is avoiding the banding processing only on some band, while directly handling the band by the output controller 1125, and transmitting the data of the band to the printer engine 140 at necessary timing.

When the pre-rendering of the bands including the RGB representation data has been completed, the CPU 1120 generates YMCK objects for execution of rendering of the other bands, and instructs the rendering processing execution unit 1123 to perform rendering (S7). The bands without RGB representation data are subjected to rendering in YMCK color space by the rendering processing execution unit 1123, and mapped in the image memory 1124 (S8), and subjected to the banding processing.

Then in the respective band data rendered as RGB data, stored in the RAM 1122, the output order is adjusted with that of the bands outputted through the banding processing, and sent by the output controller 1125 to the printer engine 140 (S9).

In the above-described embodiment, the data inputted from the host computer 200 is character code including band information or the like, a print command or print data described in the form of printer control language or the like, however, it may be arranged such that the RGB objects or YMCK objects are generated on the host computer 200 and outputted to the printer.

Further, in the above-described embodiment, the rendering processing execution unit 1123 is provided as the YMCK renderer in the printing apparatus, however, a module called a RIP (Raster Image Processing) which operates in another computer may be utilized as the YMCK renderer via a network. Further, if the processing capability of the host computer 200 is sufficiently high or if printing is performed by a printer without renderer (rendering processor), a YMCK renderer may be provided on the host computer.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a program product (including storage medium holding program code, a compressed program downloaded from a server and the like) holding software program code for realizing the functions of the above-described embodiment to a system or an apparatus, and executing the program code by a computer (e.g., CPU, MPU) of the system or apparatus. In this case, the program code itself held in the program product realizes the functions according to the embodiment, and the program product or storage medium constitutes the invention. Furthermore, besides aforesaid functions according to the above embodiment are realized by executing the program code by the computer, the present invention includes a case where an OS (operating system) or the like working on the computer performs a part or entire actual processing in accordance with designations of the program code and realizes the functions according to the above embodiment.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

As described above, according to the present invention, print information having mixed first image region to be processed in particular color space and region not to be necessarily processed in particular color space, while maintaining image validity and reproducibility and preventing degradation of throughput.

[Other Embodiment]

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

The invention claimed is:

1. An image processing apparatus for forming an image based on data inputted from an external apparatus, comprising:
 a separator, arranged to separate a first image region to be processed in particular color space and a second image region not to be processed in particular color space, from print information accompanying a print request issued from the external apparatus in accordance with color space information of an image region attached to the print information; and
 a rendering section, arranged to perform respectively different rendering processing on print information in the separated first and second image regions.

2. The apparatus according to claim 1, wherein said rendering section performs rendering processing on the print information in the first image region as RGB representation data, and performs the rendering processing on the print information in the second image region as YMCK representation data.

3. An image processing system having a data processing apparatus and an image processing apparatus, wherein said data processing apparatus comprising:
 a detector, arranged to detect a first image region to be processed in particular color space and a second image region not to be processed in particular color space, from print information in accordance with color space information of an image region attached to the print information; and
 a notifying section, arranged to notify the detected image regions to dais image processing apparatus,
 and wherein said image processing apparatus comprising:
 a separator, arranged to separate print information in the first and second image regions, based on notification by said notifying section; and
 a rendering section, arranged to perform respectively different rendering processing on the print information in the separated first and second image regions.

4. The system according to claim 3, wherein the first image region has print information to be subjected to rendering processing as the RGB representation data, and the second image region has print information to be subjected to rendering processing as the YMCK representation data.

5. An image processing method of forming an image based on data inputted from an external apparatus, comprising the steps of:
 Separating a first image region to be processed in particular color space and a second image region not to be processed in particular color space, from print information accompanying a print request issued from the external apparatus in accordance with color space information of an image region attached to the print information; and
 performing respectively different rendering processing on print information in the separated first and second image regions.

6. The method according to claim 5, wherein in the rendering step, rendering processing is performed on the print information in the first image region as RGB representation data, and the rendering processing is performed on the print information in the second image region as YMCK representation data.

7. A method of controlling an image processing apparatus having a data processing apparatus and an image processing apparatus, comprising the steps of:
 causing the data processing apparatus to detect a first image region to be processed in particular color space and second image region not to be processed in particular color space, from print information in accordance with color space information of an image region attached to the print information, and notify the detected image regions to the image processing apparatus; and
 causing the image processing apparatus to operate print information in the first and second image regions, based on notification by data processing apparatus; and to perform respectively different rendering processing on the print information in the separated first and second image regions.

8. The method according to claim 7, wherein the first image region has print information to be subjected to rendering processing as the RGB representation data, and the second image region has print information to be subjected to rendering processing as the YMCK representation data.

9. A computer program product storing a computer readable medium comprising a computer program code for an image processing method of forming an image based on data inputted from an external apparatus, the method comprising the steps of:
 separating a first image region to be processed in particular color space and second image region not to be processed in particular color space, from print information accompanying a print request issued from the external apparatus in accordance with color space information of an image region attached to the print information; and
 performing respectively different rendering processing on print information in the separated first and second image regions.

10. A computer program product storing a computer readable medium comprising a computer program code for a method of controlling an image processing system which has a data processing apparatus and an image processing apparatus, the method comprising the steps of:
 causing the data processing apparatus to detect a first image region to be processed in particular color space and a second image region not to be processed in particular color space, from print information in accordance with color space information of an image region attached to the print information, and notify the detected image regions to the image processing apparatus; and
 causing the image processing apparatus to separate print information in the first and second image regions, based on notification by the data processing apparatus; and perform respectively different rendering processing on the print information in the separated first and second image regions.

* * * * *